INVENTORS
CLIFFORD H. SNYDER
MAX DAIL THOMPSON
BY
William L. Carothers
THEIR ATTORNEY

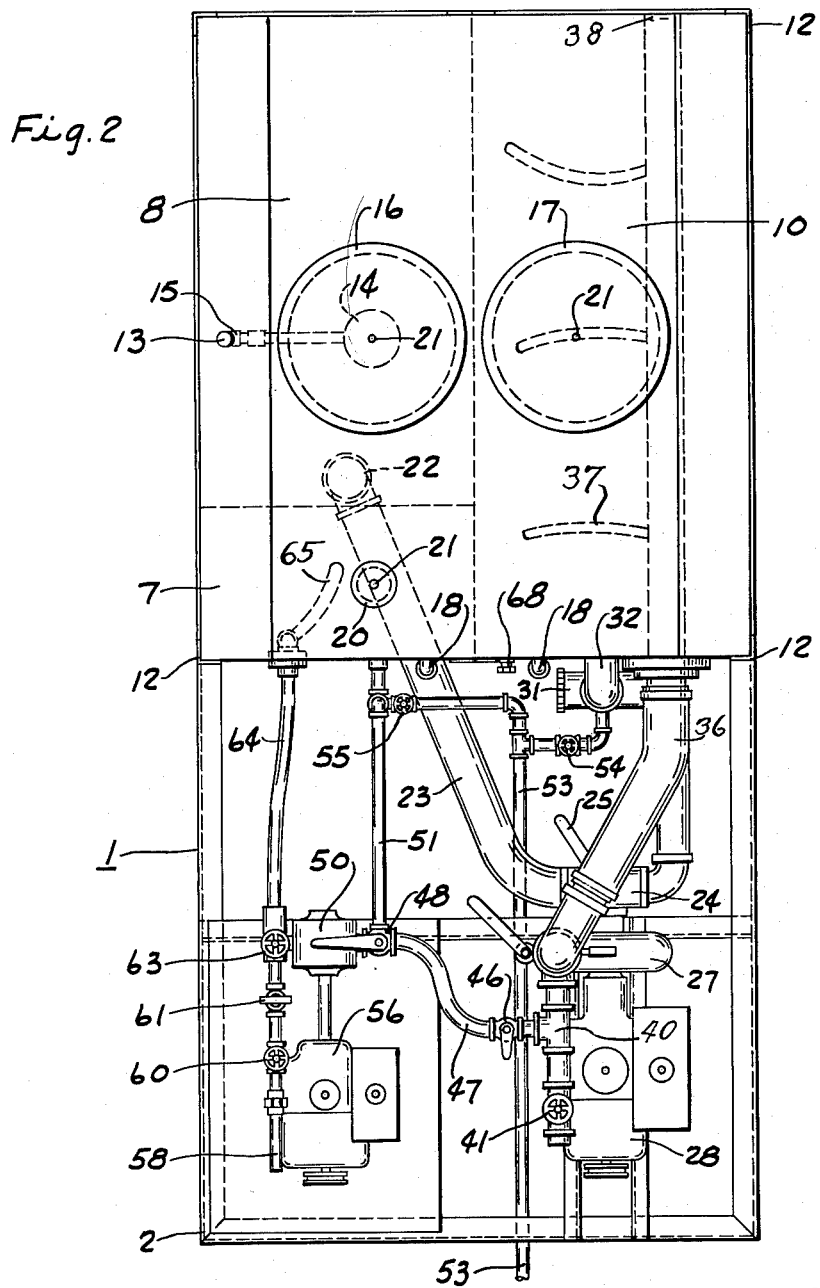

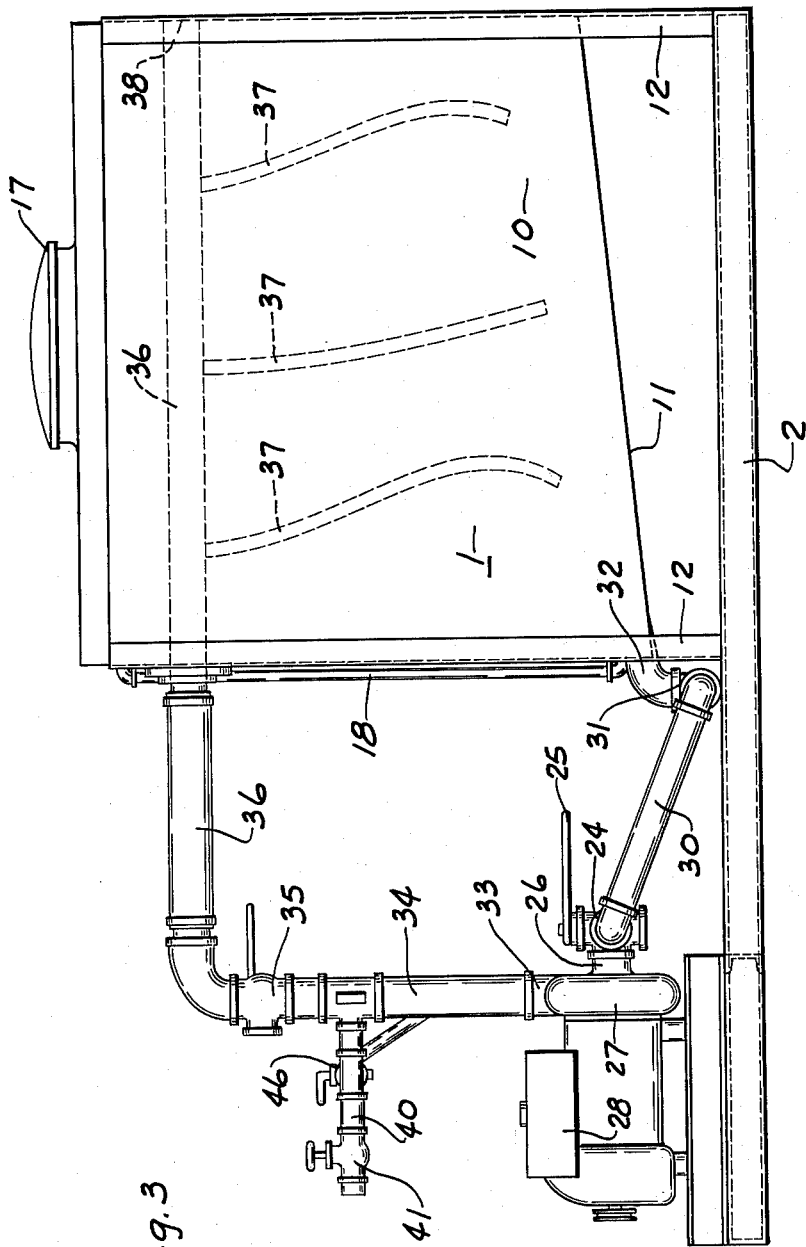

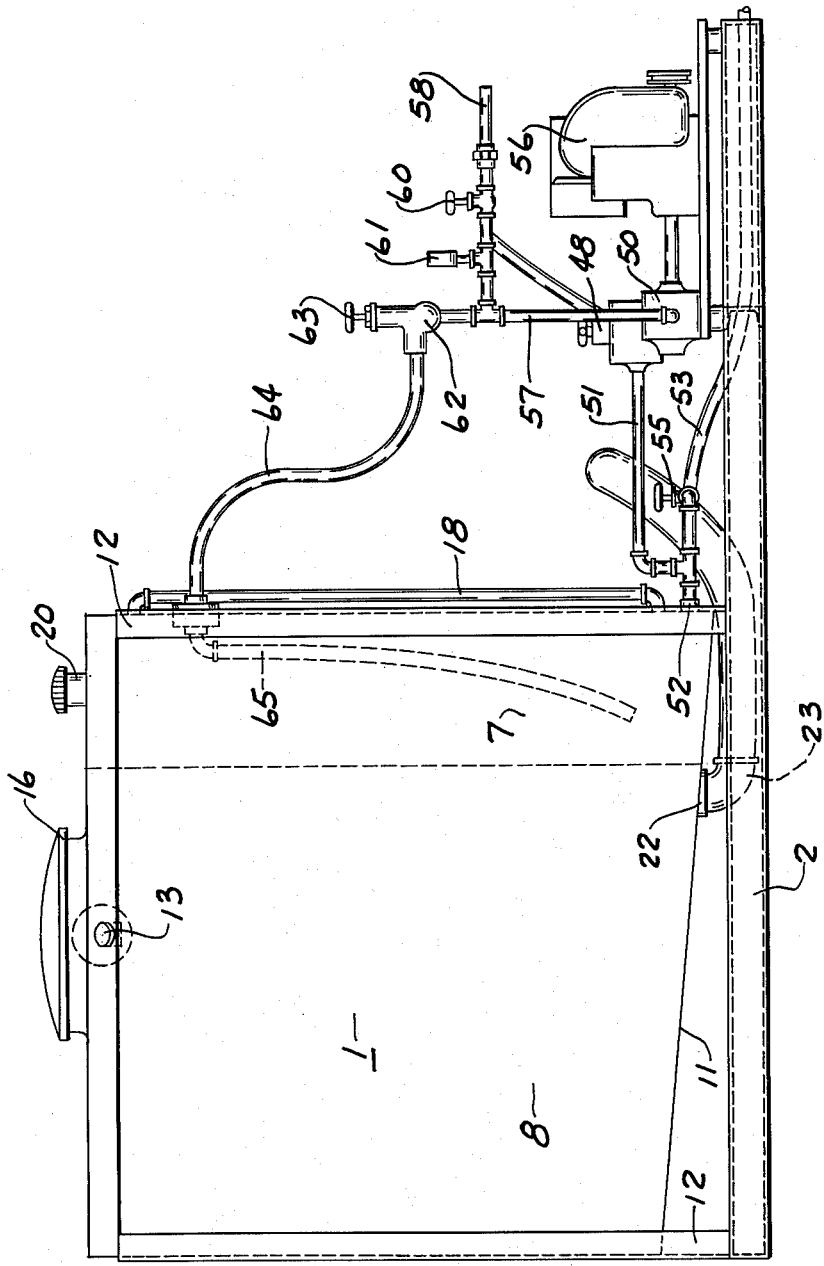

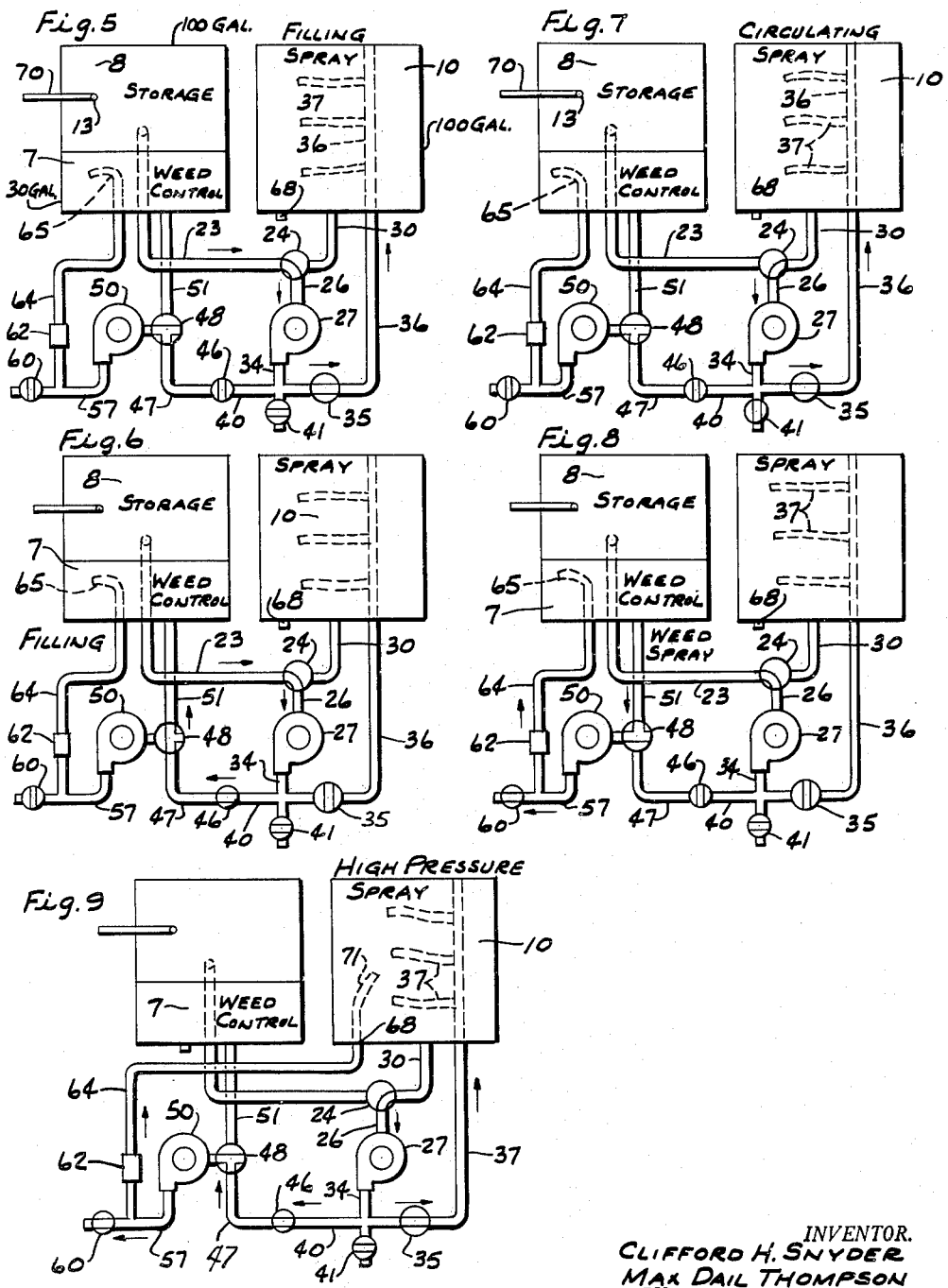

June 13, 1961 C. H. SNYDER ET AL 2,988,286
APPARATUS FOR MAINTAINING SOLIDS IN SUSPENSION AND FOR
MAINTAINING ACCURATE PROPORTIONS OF TREATING
SOLUTIONS AND FOR APPLYING THE SAME
Filed Dec. 27, 1956 6 Sheets-Sheet 6
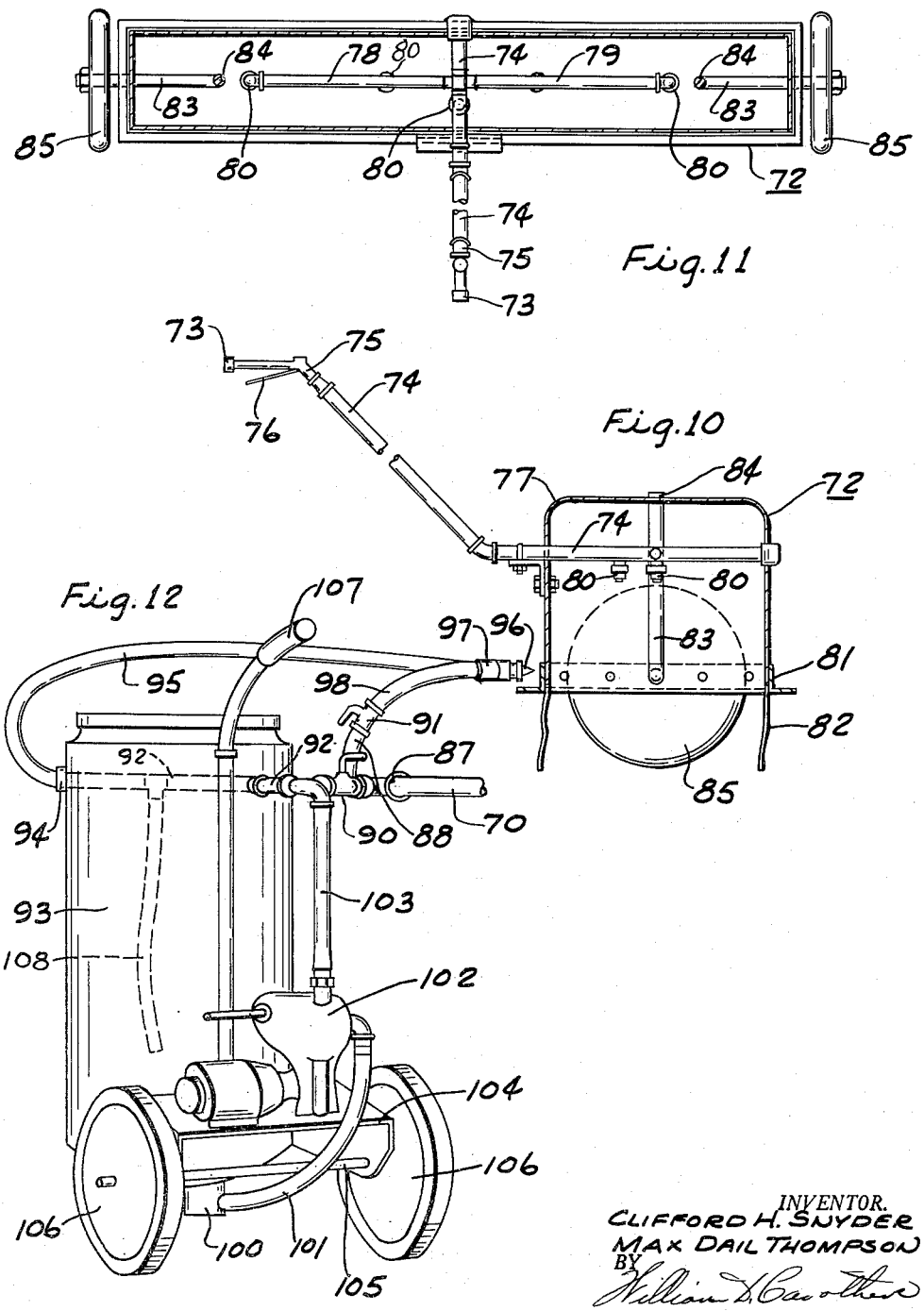
INVENTOR.
CLIFFORD H. SNYDER
MAX DAIL THOMPSON
BY
THEIR ATTORNEY

United States Patent Office 2,988,286
Patented June 13, 1961

2,988,286
APPARATUS FOR MAINTAINING SOLIDS IN SUSPENSION AND FOR MAINTAINING ACCURATE PROPORTIONS OF TREATING SOLUTIONS AND FOR APPLYING THE SAME
Clifford Hutchison Snyder, R.D. 1, Sunnyhill Farms, Imperial, Pa., and Max Dail Thompson, New Lexington, Ohio; said Thompson assignor to said Snyder
Filed Dec. 27, 1956, Ser. No. 630,915
9 Claims. (Cl. 239—124)

This invention relates generally to spraying apparatus and more particularly to a mobile apparatus for spraying lawns, shrubs, trees, to kill weeds and insects and to distribute both liquid and solid plant food and fertilizer and to sow seed.

The principal object of this invention is the provision of a tank unit and motor connected by control valves for mixing by recirculation an additive with a liquid vehicle, such as water, to provide a uniform mixture that may be distributed over the object by spraying the vehicle under pressure. The additive may be a weed or crabgrass killer, a fertilizer or soil treating material in liquid or in solid powdered form or a lawn seed. The initial recirculation to thoroughly mix the additive and the water is maintained while the batch is distributed to insure uniform consistency.

Another object is the provision of a recirculatory batch spray wherein the recirculation line empties through a flexible whipping tube to maintain the mixture uniform in said container.

Other objects and advantages of this invention appear hereinafter in the following description and claims.

The accompanying drawings show for the purpose of exemplification without limiting this invention or the claims thereto, certain practical embodiments illustrating the principles of this invention wherein:

FIG. 2 is a plan view of the tank and pump structure that is demountable as a unit from the truck.

FIG. 3 is a view in elevation of the right side of the tank and pump unit.

FIG. 4 is a view in elevation of the left side of the tank and pump unit.

FIGS. 5 to 9 are diagrammatic views illustrating the various positions of valves connecting the supply and discharge with the tanks and pumps.

FIG. 10 is a sectional view of a spraying nozzle cart shown in FIG. 1.

FIG. 11 is a bottom plan view of the spraying nozzle cart shown in FIG. 10.

FIG. 12 is a perspective view of a hand spray structure of the class shown in FIG. 1.

Figure 1:
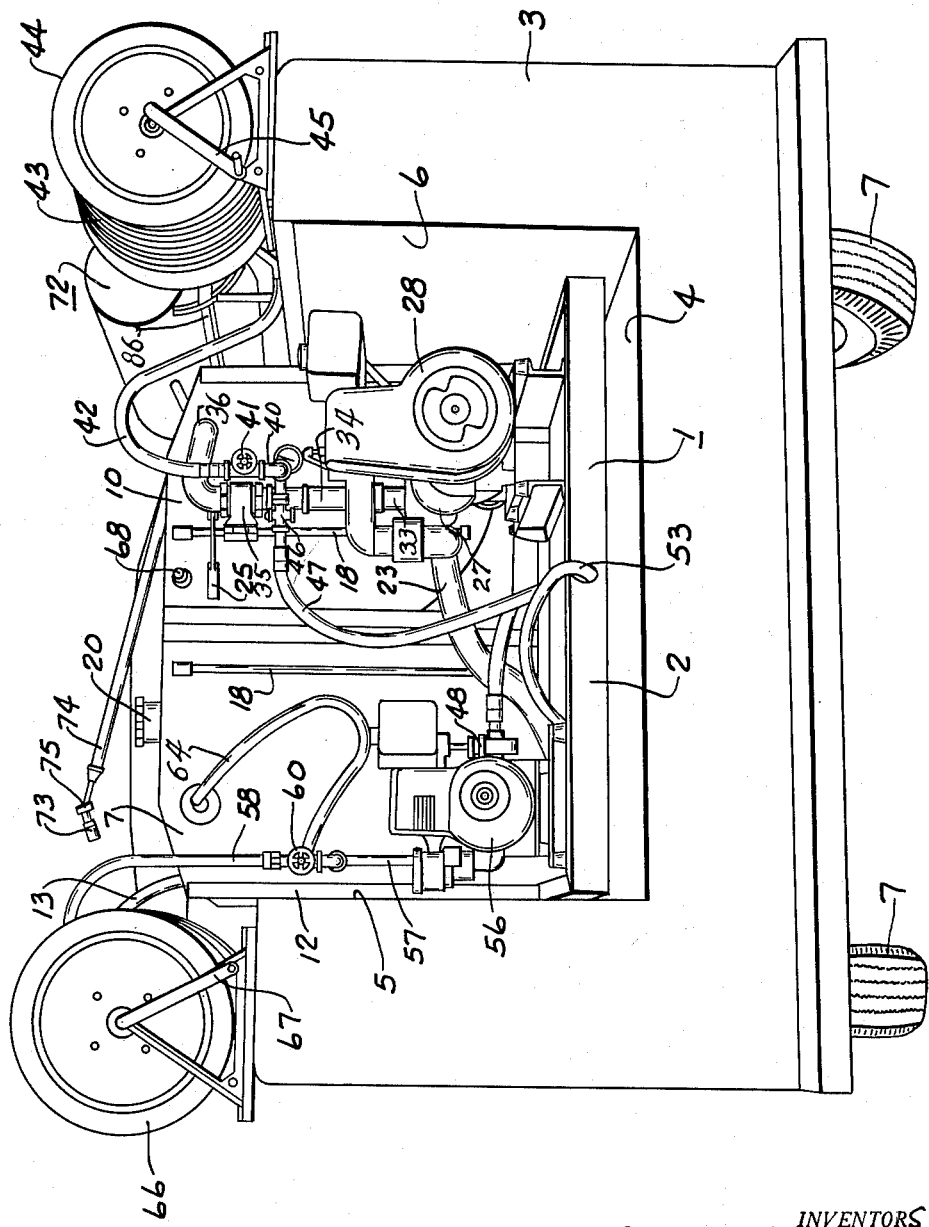
FIG. 1 is a perspective view of the spraying equipment installed on a truck.

Referring to FIG. 1 the spraying device 1 is mounted on a base frame 2 slidable into the rear of a pickup type truck having a body 3 with a floor 4 and sides 5 and 6 which body is mounted on the wheels 7 to provide a mobile unit. The sides 5 and 6 are provided with coverage which opens outwardly of the truck body for the purpose of retaining the supplies and tools.

As shown in FIGS. 2 to 4 the frame 2 supports the three tank members or containers 7, 8 and 10 which are preferably constructed of aluminum and are provided with sloping bottoms as indicated at 11 so that their forward end provides a sump in each of the tanks. As indicated in FIGS. 5 to 9 the small tank 7 is a weed control tank. Tank 8 is a storage tank and the tank 10 is a spray tank. These tanks are suitably supported by the vertical angle members 12 and thus provide a rigid structure for the unit 1. The supply tank 8 has an inlet connection 13 receiving the conveying liquids such as water. A hose from a suitable source of water supply is connected to the opening 13 and a float member 14 which actuates the float valve 15 is provided for controlling the shut off of the water supply when the tank 8 is filled. The tanks 8 and 10 have the large lid members 16 and 17 respectively which permits the insertion therein of powdered or granular material as well as permitting the cleaning of the tanks when necessary. The front of each of the tanks 7 and 10 is provided with a sight gauge such as illustrated at 18 to determine the level of the liquid within the tank without opening the lids thereof. The smaller weed tank 7 is provided with a smaller lid 20. Each of the lids 16, 17 and 20 is provided with vents 21 which prevents any accumulation of any pressure or subpressure within the tank. Thus the tanks are open at all times to the atmosphere due to these vents. The lower end of the bottom of each tank is provided with an outlet. The outlet to tank 8 is at 22 and is connected by the pipe 23 to the valve member 24. The valve member 24 is a three way valve which when the handle 25 is in one position it will connect the line 23 to the inlet 26 of the pump 27 which is operated by a suitable motor such as the gasoline motor 28. If the valve handle 25 is thrown to the position opposite to that shown in FIG. 2 the outlet of tank 10 is connected to the suction side of the pump 27. The pipe line 30 has one end connected to the valve 24 and the other end connected through a filter 31 to the bottom and outlet end 32 of the spray tank 10 as illustrated in FIG. 3. The outlet 33 of the pump 27 is connected to the pipe line 34 and the valve member 35 and the line 36 to the top of the tank 10. The line 36 enters the tank 10 and that portion in the tank becomes a header which is provided with a series of agitating members such as indicated by the three whipping tubes 37 which are flexible hose connected to outlets in the pipe 36 and which when liquid is discharged therefrom will whip violently within the liquid in the tank 10 so as to create a mixing turbulence. The end of the pipe 36 is plugged as indicated at 38. Intermediate the pipe 34 and the valve 35 is a lateral pipe 40 which is provided with a discharge control valve 41 that is ordinarily connected as shown in FIG. 1 through the flexible connection 42 to the hose 43 on the reel 44, the other end of the hose being capable of being drawn for a considerable number of feet away from the truck. The reel is provided with a crank member 45 for winding up the hose.

The line 40 is also provided with a valve 46, the other end of which is connected through the flexible line 47 to the valve member 48. The valve member 48 has one side connected to the high pressure pump 50 and the other side connected to the line 51 to the bottom or sump 52 of the weed control tank 7.

Both the strainer 31, in the tank 10 at its outlet 32 and the outlet 52 of the tank 7 are connected together by the common drain pipe 53. The drain of the tank 10 being controlled by the valve member 54 and the drain of the tank 7 being controlled by the valve member 55. However the drain pipe 53 extends through the frame 2 of the unit and is preferably directed to a sewer. The high pressure pump 50 is operated by the gasoline motor 56 and the outlet of this pump is connected to the line 57 which is further connected to discharge 58 which is controlled by the valve member 60 and is provided with a pressure gauge 61. The line 57 is also connected to the regulating valve 62 which is controlled by the handle 63 for the purpose of returning fluid through the flexible coupling 64 to the top of the tank 7 where it enters the tank through the flexible whipping hose 65.

The discharge line 58 as shown in FIG. 1 is connected to the hose on the reel 66 which also may be wound up by the crank member 67. Thus the output of the high pressure pump 50 is usually conducted through the hose on the reel 66; whereas the output of the pump 27 is connected through the hose on the reel 44. The tank end of the flexible line 64 may be disconnected from the tank 7 and made fast to the connection 68 on the tank 10 as shown in FIGS. 2 and 9, in which instance both pumps 27 and 50 are connected in tandem to produce high pressure in a range anywhere from 50 to 300 pounds per square inch and a certain portion of the material withdrawn from the tank 10 is recirculated back through the hose 64 to the tank 10.

When this spray apparatus is about to provide a service, a spray line such as the hose 70 shown in FIG. 5 is connected to the connection 13 on the tank 8 and permitted to run until the float valve 15 actuated by the float 14 shuts off the water supply. When the tank 8 is filled with water then it may be pumped by throwing the valve 24 as shown in FIG. 5 and operating the pump 27 and closing the valves 41 and 46 by opening the valve 35 so that the water is pumped into the tank 10 through the whip hose lines 37. Regardless of whether the material to be sprayed is a soluble or an insoluble, it is added through the door or lid 17 to the tank 10 and when the water is pumped thereinto, it causes the material to become mixed with the water so as to provide a uniform solution. The tank 10 holds 100 gallons of solution and the tank 8 holds 100 gallons of water or enough to fill the tank 10. Thus when one proportions the mix to be made in the larger tank 10, one may employ all of the water from the tank 8, any known part of it which can be read from the sight gauge 18 on the tank 10. After the water has been added to the tank 10 the valve 24 will be changed as indicated in FIG. 7 and the valve 41 will be open to discharge the spray mixture through the hose line to the lawn or other subject that is to receive the spray material. The valve 35 is set so that a given proportion of material pumped from the tank 10 through the line 30 and valve 24 by the pump 27 will be recirculated back through the valve 35, line 36 through the tank 10 and through the flexible whip hoses 37 so as to maintain the material in suspension at all times. This is continued until the tank is depleted and a fresh batch of water is then measured with a fresh supply of material in the tank 10.

In order to fill the tank 7 which ordinarily contains a weed control and is usually weed or crab grass control and is usually a poison, the water is pumped from the tank 8 through the line 23, the valve 24 by the pump 27 and is directed through the line 40, valve 46, line 47, valve 45 and the line 51 to the tank 7 to thereby fill the same. Thus tank 7 is filled from the bottom and the sump is back washed by the water entering the tank as illustrated in FIG. 6.

When the weed control is to be used out of the tank 7 the valves are set as shown in FIG. 8 wherein the valve 45 disconnects the pump 27 and connects the line 51 to the pump 50. The cap 20 on the tank 7 is removed and the weed control or killer is placed in this tank and the water is then pumped from the bottom of the tank through the pipe 51, valve 48, the pump 50, the line 57 to the pressure control valve 62 and the line 64 back to the tank 7 passing through the flexible whip hose 65 to thus insure a thorough mix of the material in the tank 7. When it is believed that the material is thoroughly mixed the valve 60 is opened to carry the solution through the hose on the reel 66 to thus spray the lawn or garden as the case may be. However the valve 62 is adjusted to bypass a certain amount of the liquid pumped so that a continuous circulation is provided in the tank 7 to maintain constant the solution in this tank until it is depleted. The whipping hose 65 keeps the material agitated at all times.

When it is desired to use the larger tank 10 and obtain a higher pressure of the material being sprayed, the valves are connected as shown in FIG. 9 wherein the material in the tank 10 is pumped by the pump 27 and a portion thereof is bypassed back through the tank 10 to maintain the solution in agitation. The valve 46 is likewise open to supply the solution through the line 47 to the valve 45 and thence to the pump 50 and the valve 62 will bypass again a certain portion of the liquid back through the line 64 to the connection 68 and the flexible whipping hose 71 in the tank 10. The goodly portion, of course, of the liquid will pass out the valve 60 through the hose on the reel 66. Very high pressures can develop when both the pumps 27 and 50 are placed in tandem in this manner. As shown in FIGS. 1, 10 and 11 the nozzle member 72 is for distributing weed killer, crab grass killer, lime, other fertilizer or grass seed over the lawn either using the hose 43 and the reel 44 or the hose on the reel 66. The hose is made fast at the hose connection 73 which functions on the end of the stem 74 which functions as a handle and is provided with a hand valve 75 controlled by the trigger 76. The stem 74 is a pipe that extends down into the hood member 77 and is connected to the lateral lines 78 and 79. As shown in FIG. 11, three nozzles 80 are provided on the line 74 and the end of the line 78 and 79 which discharges the liquid downwardly into the ground. The perimeter of the hood 75 is reinforced by the angle iron 81 and also clamps through the encircling flexible skirt 82 which confines the carrying liquid and its contents to that area which the hood encloses. A shaft 83 is passed through the end of the angle members 81 and is bent upwardly and passed through the hood 77 and attached thereto as indicated at 84. The end of each shaft extends outside of the hood and is provided with the wheels as indicated at 85. Thus the wheels and the shafts are independent of the liquid distributing system. Of course, the series of nozzles may be placed all along the underside of the lateral branches 78 and 79 for having many spray openings. As shown in FIG. 1 the truck is provided with a rack 86 for receiving and holding this nozzle beside the reel 44 which is permanently supported on the truck. It will be noted that the reels and the nozzle 72 provide clearance so as to permit the unit 1 to be withdrawn and inserted in the body of the truck.

The structure in FIG. 12 is a small hand unit similar to that shown on the truck and since only one tank is involved it is not necessary to provide additional valves. As shown in FIG. 12 the supply line 70 for feeding water to the tank is connected as at 87 to the line 88. The line 88 is provided with two valves, one indicated at 90 and one indicated at 91. The valve 90 controls the flow of water to the line 92 from whence it passes through the tank 93 a supply branch in the form of the flexible whipping hose indicated at 108 supplies water to the tank 93 and produces agitation to thoroughly mix the solution therein. The discharge end of the line 92 is connected to the spring loaded check valve 94 which has a flow control orifice C and the discharge hose 95 which conducts liquid to a nozzle such as indicated at 96. A Y-connection 97 is provided to receive the discharge end of the line 98 that passes directly from the valve 91 which is a combination metering and flow control valve to provide water directly to the nozzle 96. When water is to be applied to the tank the valve 91 may be closed; when open it provides a predetermined orifice to control the flow.

The bottom of the tank 93 is provided with a sump 100 which contains a filter screen which prevents recirculation of large chunks of material. This sump has connected thereto the flexible connection 101 to the inlet of the pump 102. The outlet of the pump 102 passes through the transparent connection 103 to the line 92 for recirculating material through the whipping hose 108 within the tank 93. By closing the valve 91 and opening the valve 90 one may recirculate a portion of the liquid contained in the tank 93. In normal operation material is placed in the tank 93 which is then filled with water. The valve 90 is then closed and the pump 102 is started so as to recirculate a part of the mixture and maintain an agitation by the whipping hose 108 and a portion of the material is discharged through the check valve 94 and the discharge line 95 to the discharge nozzle 96. At the same time the valve 91 is opened to meter a supply of water from the supply line 70, the line 88, the valve 91 and the discharge line 88 to the discharge nozzle 96 where it mixes with the mixture coming from the tank and is applied by the spray nozzle 96. Thus the material within the tank 93 may be recirculated at the same time it is being depleted to insure a thorough mixture of the materials within the water that is used as a vehicle.

The tank 93 is provided with a bracket 104 having a shaft 105 to support the wheels 106 and the handle 107 is provided to permit one to wheel the tank over the lawn.

We claim:

1. A spray structure for suspending and distributing granular material with a liquid comprising a spray nozzle, a vented container having an inlet and an outlet and containing a liquid and granular solids therein, a pump having a suction and a discharge, a line connecting said suction pump and said container outlet to supply liquid and granular solids from said container to said pump, a high pressure pump having a suction and a discharge, a valve controlled transfer line connecting the discharge of said first pump to the suction of said high pressure pump, a valve control line connecting said high pressure pump discharge to said container inlet to regulate the amount of recirculated liquid and granular solid to said container, and a second valve controlled line connecting said high pressure pump discharge to said spray nozzle to discharge that portion of liquid and granular solids not being simultaneously circulated back to said container.

2. A spray structure for suspending and distributing granular material with a liquid comprising a spray nozzle, a vented container having an inlet and an outlet and containing a liquid and granular solids therein, a pump having a suction and a discharge, a line connecting said suction pump and said container outlet to supply liquid and granular solids from said container to said pump, a valve controlled line connecting said pump discharge to said container inlet to regulate the amount of recirculated liquid and granular solid to said container, a second valve controlled line connecting said pump discharge to said spray nozzle to discharge that portion of liquid and granular solids not being simultaneously circulated back to said container, a three-way valve in said line between said pump suction and said container outlet, a liquid storage tank, and an outlet from said storage tank to said three-way valve to select liquid from said container or from said storage tank to supply to said recirculation line and said container.

3. A spray structure for suspending and distributing granular material with a liquid comprising a spray nozzle, a vented container having an inlet and an outlet and containing a liquid and granular solids therein, a pump having a suction and a discharge, a line connecting said suction pump and said container outlet to supply liquid and granular solids from said container to said pump, a valve controlled line connecting said pump discharge to said container inlet to regulate the amount of recirculated liquid and granular solid to said container, a second valve controlled line connecting said pump discharge to said spray nozzle to discharge that portion of liquid and granular solids not being simultaneously circulated back to said container, a second spray nozzle, a vented solution tank having an inlet and an outlet and containing a liquid spray solution, a high pressure pump having a suction and a discharge, a three-way valve having one port connected to the suction of said high pressure pump, a line connecting one port of said three-way valve to the outlet of said tank, a third valve control line connecting the discharge of said high pressure pump to said tank inlet to regulate the amount of recirculated solution to said solution tank, a fourth valve controlled line connecting said high pressure pump discharge to said second spray nozzle, a valve controlled transfer line connecting said first pump discharge to the third port of said three-way valve to fill said solution tank from said first pump with liquid or with liquid and granular material in suspension when said three-way valve is in one position and to supply the same to the suction of said high pressure pump when said three-way valve is in a second position.

4. The spray of claim 3 characterized by a valved drain from said container and said solution tank connected to a common discharge.

5. The spray of claim 3 characterized by an open-ended flexible hose having solid walls connected to the inlet of said container and said solution tank to whip and stir the solution therein.

6. The spray of claim 3 characterized by a common skid frame supporting said container and said tanks and said pumps to form a spraying unit, and a truck bed to receive said skid frame.

7. The spray of claim 3 characterized by a pair of hose reels mounted on said truck bed and connected with the first and second discharge of said pumps for distributing the spray.

8. A spray structure for suspending and distributing granular material with a liquid comprising a spray nozzle, a vented container having an inlet and an outlet and containing a liquid and granular solids therein, a pump having a suction and a discharge, a line connecting said suction pump and said container outlet to supply liquid and granular solids from said container to said pump, a valve control line connecting said pump discharge to said container inlet to regulate the amount of recirculated liquid and granular solid to said container, a vented solution tank having an inlet and an outlet and containing a liquid spray solution, a high pressure pump having a suction and a discharge, a second valve controlled line connecting said high pressure pump suction to said tank and to the discharge of said first pump, a third valve controlled line connecting the discharge of said high pressure pump to said tank inlet to regulate the amount of recirculated liquid to said solution tank, and a fourth valve controlled line connecting said high pressure pump discharge to said spray nozzle to discharge that portion of the liquid solution and granular solids not being simultaneously circulated to said container and to said tank.

9. A spray structure for mixing and distributing granular material with a conveying liquid which comprises, a vented container having an inlet for receiving liquid, a sump with an outlet to contain the granular material with a liquid, a pump having a suction and a discharge, a line connecting said pump suction and said container sump to supply the mixed liquid from said container to said pump and a line connecting said pump discharge to said inlet, a divider connected to said container outlet for dispensing a portion of the liquid pumped and for directing a portion of the liquid pumped to said vented container, solid wall open-ended flexible hose means to direct the recirculated flow at such velocity as to deliver the liquid under force at continuously varying points in said vented container, said flexible hose means positioned to cooperate and move the material by its ejected stream, said flexible hose means through its mechanical whipping action also moving the material to provide cooperative hydraulic and mechanical blending action within said vented container.

References Cited in the file of this patent

UNITED STATES PATENTS 880,240    Overhiser _____ Feb. 25, 1908

(Other references on following page)

UNITED STATES PATENTS

| | | | |
|---|---|---|---|
| 1,191,607 | Mills | July 18, | 1916 |
| 1,194,358 | Cecil et al. | Aug. 15, | 1916 |
| 2,383,946 | Tietig | Sept. 4, | 1945 |
| 2,462,034 | Zeck | Feb. 15, | 1949 |
| 2,501,047 | Gustafsson | Mar. 21, | 1950 |
| 2,603,384 | Wieschel | July 15, | 1952 |
| 2,634,110 | Rupp | Apr. 7, | 1953 |
| 2,757,044 | Gerbracht | July 31, | 1956 |
| 2,810,606 | Taylor | Oct. 22, | 1957 |
| 2,857,202 | Snyder | Oct. 21, | 1958 |

UNITED STATES PATENT OFFICE
CERTIFICATE OF CORRECTION

Patent No. 2,988,286            June 13, 1961

Clifford Hutchison Snyder et al.

It is hereby certified that error appears in the above numbered patent requiring correction and that the said Letters Patent should read as corrected below.

Column 5, line 29, and column 6, line 35, for "control", each occurrence, read -- controlled --.

Signed and sealed this 31st day of October 1961.

(SEAL)
Attest:

ERNEST W. SWIDER
Attesting Officer

DAVID L. LADD
Commissioner of Patents

USCOMM-DC